Aug. 7, 1945. H. KOCH Re. 22,658

BONE CONDUCTION AUDIPHONE

Original Filed Aug. 31, 1935

INVENTOR:
HENRY KOCH,
Hoguet, Fleary & Campbell
BY
his ATTORNEYS

Reissued Aug. 7, 1945

Re. 22,658

UNITED STATES PATENT OFFICE 22,658

BONE CONDUCTION AUDIPHONE

Henry Koch, Jamaica, N. Y., assignor to Dictograph Products Company, Inc., New York, N. Y., a corporation of Delaware Original No. 2,144,458, dated January 17, 1939, Serial No. 38,682, August 31, 1935. Application for reissue January 18, 1940, Serial No. 314,564

9 Claims. (Cl. 179—107)

This invention relates to audiphones and has particular reference to audiphone receivers having a vibrating element adapted to be placed in operative connection with the bone structure of the user for transmitting audible sounds picked up by a suitable microphone to the inner ear through the bone structure.

In copending application Serial No. 678,130, filed June 29, 1933, now Patent No. 2,148,024, there is disclosed a bone conduction receiver which is characteristic in that the electromagnetic means of the receiver is supported by the tympanum or reed, so that, in response to energization by voice currents, the inertia of the electromagnetic means causes it to in effect remain stationary while the tympanum or reed vibrates relatively thereto. The casing of the receiver is secured to the tympanum or reed and consequently vibrates over its entire surface, so that any portion thereof may be supported by a head-band or other holder in operative connection with the bone structure of the user, such as on the mastoid eminence, for transmitting its vibrations therethrough.

This device has proven reasonably satisfactory, but because the surface area of the casing wall which engages the bone is relatively large, a considerable amount of power is required to produce sufficiently strong vibrations to enable the user to hear well. In this respect the so-called button type of bone conduction receiver, in which a button carried by the tympanum or reed engages the bone structure, has certain advantages, because the area of contact of the button is relatively small and its vibrations are concentrated and it is not necessary to vibrate the headband, with the result that less power is required to operate the receiver. However, the button type of bone receiver as heretofore constructed is not practicable, because the pressure which must be applied to the electromagnetic means in order to secure firm contact between the button and the bone causes the vibrations of the tympanum or reed to be suppressed and sometimes closing of the magnetic gap.

In accordance with one form of the present invention, a bone conduction receiver is provided in which the advantages of the button type receiver, in so far as concentrated vibration and reduced power-consumption are concerned, are combined with the advantages of the reaction or inertia type bone receiver, in so far as practicability and operating effectiveness are concerned.

The aforementioned form of the invention has several modifications, one of which comprises an electromagnetic means supported by its tympanum or reed on the face plate of a casing adapted to be supported by a headband or the like in position for operative connection with the bone structure of the user, and having a button extending through the face plate and connected to the electromagnetic means so that the receiver casing, due to the inertia of the electromagnetic means, vibrates as a unit and at the same time the button concentrates a portion of the vibrations. In this way, the face plate engages a relatively large area of the bone and the button engages a relatively small area of the bone, and the instrument combines the advantages of the button and inertia or reaction type of bone receiver without having the disadvantages of these two types of devices. The electromagnetic means is preferably of the cantilever type with the button located adjacent the fulcrum, to produce powerful button vibrations of small amplitude.

Another modification of the invention comprises a casing supported by a headband or other holder and having the electromagnetic means secured thereto in such a way that the tympanum or reed vibrates freely therein without producing a reaction sufficient to materially vibrate the casing, because the inertia of the reed is relatively low. Secured to this tympanum or reed is a button projecting through the face plate of the casing for operative connection with the bone structure of the user, the tympanum or reed being stiff and substantially unaffected by any pressure which is applied to the button by contact between it and the bone structure of the user. In this form, the so-called button effect predominates, as compared to the inertia or reaction effect.

In another form of the invention, the electromagnetic means is secured to the casing, which is supported by the headband, while the contactor, adapted to operatively engage the bone structure of the user, is secured to the tympanum or reed, so that the reaction effect is relatively small because the inertia of the tympanum or reed is low compared to that of the electromagnetic means. This form of the invention is, in effect, a button type receiver in which the contactor button may constitute a small part of the face plate area or may have a large area, such as a large proportion or all of the area of the face plate. In that respect, the device is similar in appearance to the inertia reaction type of receiver, but differs in operation therefrom, since the whole casing is not vibrated and hence it is not necessary to vibrate the headband. Resilient means is preferably interposed between the casing and the vibrating contactor or face plate, whereby contact between the reed and the pole piece is prevented in case of undue pressure on the face plate, without any reduction in effectiveness of the vibration thereof.

It will be seen that with the several forms of this invention, the advantages of the button and inertia reaction types of bone conduction receivers are combined with the result that a more efficient and more effective instrument is produced.

For a more complete understanding of the invention reference may be had to the accompanying drawing, in which.

Figure 1:
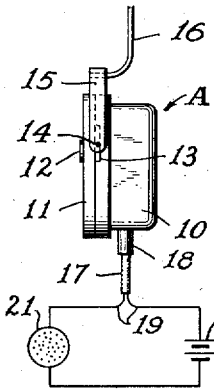
Figure 1 illustrates the new bone conduction receiver of this invention, supported on the headband and connected in a microphone circuit.

Referring to Fig. 1, the bone conduction receiver A includes a casing 10, of hard rubber, phenolic resin, or the like, having a face plate 11 with a button 12 projecting slightly beyond the latter, and with opposite surface slots 13 in which the prongs 14 of the fork 15 of the headband 16, or other holder, are pivotally inserted. An electric cord 17, connectible with separable electric connectors 18 to the electromagnetic means within the casing 10, includes two wires 19, connected in the circuit of the battery 20 and the microphone 21. Suitable amplifying means, not shown, may be provided. The receiver A is adapted to be placed with its button 12 and face plate 11 simultaneously in operative contact with the bone structure of the user, such as on the mastoid eminence behind the ear, with a headband 16 supporting the receiver A in that position.

Figure 2:
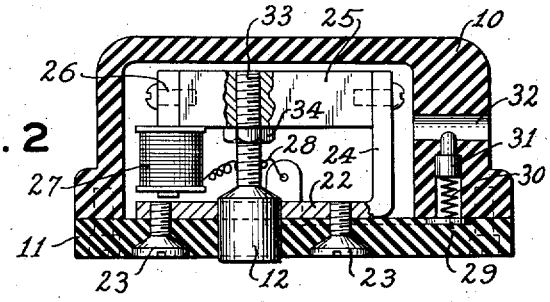
Fig. 2 is an enlarged longitudinal section through the receiver of Fig. 1.

As is illustrated in Fig. 2, the tympanum or reed 22 is secured rigidly by screws 23, or the like, to the inner surface of the face plate 11. One end, 24, of this reed 22, is turned upwardly and supports cantilever-fashion the elongated bar magnet 25 having at its free end the pole piece 26, the end of which is spaced from the corresponding surface of the reed 22 to form a narrow air gap. The speech coil 27 may be carried by the pole piece 26, and its terminals are connected by two filamentary conductors 28 to two corresponding contact plates 29 inlaid in the inner surface of face plate 11 and each electrically connected by spring 30 and plug 31 to the corresponding connector 18 of the electric cord 17 inserted in openings 32 of the casing 10.

Adjustably threaded in to the bar magnet 25 is a stem 33 having at its free end the button 12 which projects approximately 1/64 to 1/32 of an inch beyond the surface of the face plate 11, in the manner illustrated in exaggerated form in Figs. 1 and 2. The degree of projection of the button 12 beyond the surface of the face plate 11 may be adjusted by screwing stem 33 in or out of the bar magnet 25 and locking it in adjusted position by means of lock nut 34.

In operation, the bone conduction receiver A, illustrated in Fig. 2 is supported by a headband 16, or the like, in the manner shown in Fig. 1, so that the face plate 11 and the button 12 are simultaneously in operative contact with the bone structure of the user, such as the mastoid eminence. Because the inertia of the magnetic structure, including the magnet 25, the pole piece 26 and the speech coil 27, is considerably greater than the inertia of the reed 22 and its appurtenant parts, the vibration effected by the electromagnetic means in response to voice currents, causes this magnetic structure in effect to remain stationary while the reed 22 and the casing 10, 11 vibrate as a unit, thus transmitting their vibrations through the bone structure to the inner ear of the user.

The relative vibrations between the reed 22 and the magnetic structure are utilized in this receiver by means of the button 12, which is carried by the magnetic structure and thus transmits concentrated vibrations through the bone structure of the user. The spacing of the button 12 from the fulcrum of the cantilever magnetic structure carrying it, causes the button 12 to produce powerful vibrations of small amplitude, whereby power requirements are reduced. Accordingly, the receiver illustrated in Fig. 2 combines the advantages of the button and inertia or reaction type receivers, operating in the characteristic fashion of each of them without embodying their disadvantages.

Figure 3:
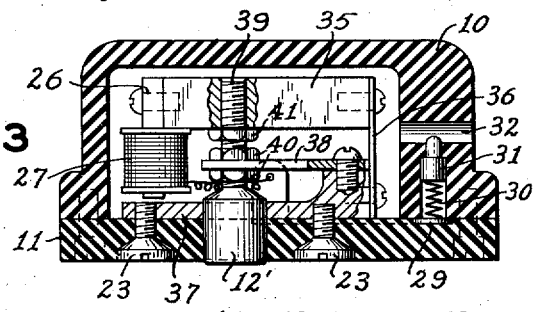
Fig. 3 is an enlarged longitudinal section through a modified form of the receiver of Fig. 2.

The receiver illustrated in Fig. 3 is a modification of the receiver of Fig. 2 in that the bar magnet 35 is supported by a spring strip 36 on the reed 37, which also carries a stiff cantilever spring 38, with respect to which the bar magnet 35 and consequently the air gap is adjustable by means of the stem 39 and nuts 40 interconnecting spring 38 and the bar magnet 35. The advantages of adjustability of the air gap and the avoidance of fatigue of the vibrating metal by this spring structure are discussed in greater detail in my copending application Serial No. 733,739, filed July 5, 1934, which discloses the structure of Fig. 3 just described.

In addition to affording a means for adjustment of the air gap and the like, stem 39 also carries the button 12' and is adjustable axially in the bar magnet to vary the degree of projection of the button 12', which is locked in adjusted position by lock nut 41. The operation of the form illustrated in Fig. 3 is the same as that described in connection with the arrangement of Figs. 1 and 2.

Figure 4:
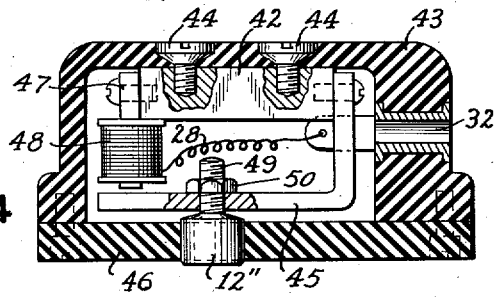
Figs. 4, 5 and 6 are enlarged longitudinal sections through other modifications of the invention.

In the modification illustrated in Fig. 4, the bar magnet 42 is rigidly secured to the back of the casing 43 by means of screws 44, so that the reed 45 extends parallel to the inner surface of the face plate 46 and is free to vibrate relatively thereto in response to energization of the electromagnet means by voice currents. Because the inertia of the reed 45 is small compared to the inertia of the magnetic structure including the bar magnet 42, the pole piece 47 and the voice coil 48, together with the casing 43 and face plate 46, the reaction effect is relatively small, although, by increasing the mass of the reed 45, the reaction effect may be increased at will.

Threaded through reed 45 is a stem 49 carrying the button 12'' projecting through face plate 46 and forming a relatively small proportion of the total surface area of the latter. The degree of projection of button 12'' beyond the surface of face plate 46 may be varied by screwing stem 49 inwardly or outwardly through reed 45 and locking it in adjusted position by means of lock nut 50. In this arrangement, practically all of the vibration of the reed 45 is concentrated in the button 12'', so that strong vibrations are transmitted through the bone to the inner ear of the user. The reed 45 is stiff and the projection of the button 12'' slight, so that there is no suppression of the vibration of the reed 45 by contact of button 12'' with the bone. The degree of vibration of the casing 43 may be varied by increasing or decreasing the mass of the reed 45 and button 12''. For example, by increasing their mass the reaction effect is increased.

Figure 5:
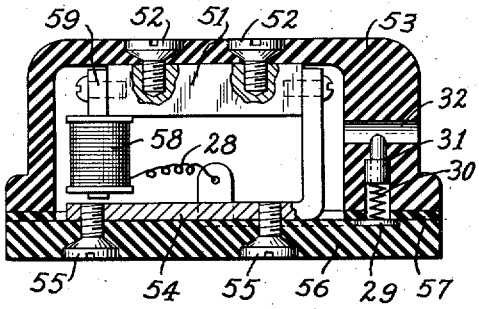

In the form of the invention illustrated in Fig. 5, the bar magnet 51 is rigidly secured by screws 52 to the casing 53, while the reed 54 is rigidly secured by screws 55 to the face plate 56. The face plate 56 and the cooperating surface of casing 53 are spaced apart to permit relative vibration between them and this space is filled by a gasket 57 of soft rubber, felt, or other cushioning material. The face plate 56 is, in effect, a button, the area of which is the entire area of face plate 56.

Energization of the speech coil 58 in accordance with voice currents, causes reed 54 and face plate 56 to vibrate relatively to the headband-supported casing 53, so that its vibrations are transmitted to the inner ear through the bone structure and little or no vibration is imparted to the head band. The gasket 57 is sufficiently firm to prevent substantial suppression of the vibration of the reed 54 because of its contact with the head, and also prevents contact or freezing between the pole piece 59 and the reed 54, as well as preventing access of dirt into the casing 53.

Figure 6:
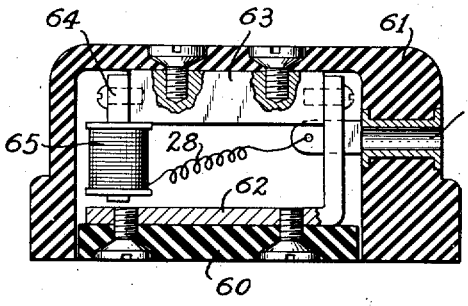

Alternatively, the arrangement of Fig. 5 may be modified as illustrated in Fig. 6 by inserting the face plate 60 within the opening of the casing 61, so that the plate 60 forms a large proportion of the area of the corresponding wall of the receiver. As the reed 62 carrying the face plate 60 is vibrated by the electromagnetic means, including the bar magnet 63, the pole piece 64 and the speech coil 65, all carried by the casing 61, the vibrations of the reed 62 are transmitted by face plate 60 through the bone structure to the inner ear of the user.

Figure 7:
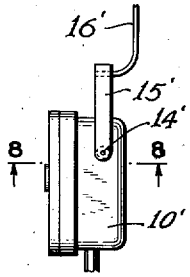
Figure 7 is a view in side elevation of a modified type of receiver embodying the invention.
Figure 8:
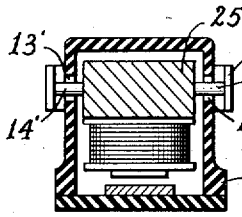
Figure 8 is a view in section taken on line 8—8 of Figure 7.

Although the reeds 22 and 37 of the forms shown in Figs. 2 and 3 are supported by the headband 16, inasmuch as the latter is connected to the casing 10, 11 to which the reeds 22 and 37 are secured, these instruments may be supported by their electromagnetic means, if desired, simply by connecting the headband to the bar magnet 25 and 35, or the like, through suitable openings in the wall of casing 10. An example of this arrangement is illustrated in Figs. 7 and 8, wherein the prongs 14' of the fork 15' of the headband 16' are shown projecting through openings 13' in the wall of the casing 10' and pivotally connected to the bar magnet 25'. Similarly, although the electromagnetic means is supported by the headband in Figs. 4, 5 and 6, inasmuch as the latter is connected to the casings 43, 53 and 61, these instruments may be supported by their reeds by connecting the headband thereto, either directly or to the face plates 56 and 60 in Figs. 5 and 6. The effect of this change of support would be to convert the forms of Figs. 2 and 3 into so-called button type bone receivers and the forms of Figs. 4, 5 and 6 into inertia or reaction type receivers.

While several preferred embodiments of the invention have been illustrated and described herein, it is to be understood that the invention is not limited thereby but is susceptible to changes in form and detail within its scope.

I claim:

1. In an audiphone, the combination of electromagnetic means adapted to respond to varying currents substantially throughout the audible frequency range, a casing secured thereto, a relatively stiff vibratory member connected to the means for vibration thereby, a contactor secured to the member and movable relatively to the casing and forming at least the major part of a wall of the casing, resilient sealing means interposed between the adjacent portions of the relatively movable contactor and the casing, and means supporting the casing with the contactor in operative contact with the bone structure of the user for conducting its vibrations therethrough to the inner ear.

2. In an audiphone, the combination of a vibratory mechanism comprising two members, relatively stiff spring means connecting said members permitting a limited relative movement between at least portions of both members, electrical means adapted to respond to varying currents within the audible frequency range secured to said portion of one of said members and operatively opposed to said portion of the other member for relatively vibrating the same, a casing for said mechanism secured to one of said members, a contactor directly secured to one of said members for engaging the user and forming at least part of a wall of the casing, and supporting means having less stiffness than said spring means mechanically coupled to the member that is not directly secured to the contactor for holding the said last named member substantially stationary with the contactor in engagement with the bone structure of the user, whereby the contactor is free to vibrate relatively to said last-named member and said supporting means, without suppression by said supporting means when said electrical means is energized for transmitting the vibrations of the contactor through the bone structure to the inner ear.

3. In an audiphone, the combination of a vibratory mechanism comprising two members, relatively stiff spring means connecting said members permitting a limited relative movement between at least portions of both members, electrical means adapted to respond to varying currents within the audible frequency range secured to said portion of one of said members and operatively opposed to said portion of the other member for relatively vibrating the same, a casing for said mechanism secured to one of said members, a contactor for engaging the user and forming a wall of said casing, and supporting means directly mechanically connected to said other member for holding the same substantially stationary in use for vibration of the contactor and casing relatively thereto when said electrical means is energized, whereby the contactor transmits its vibrations through the bone structure to the inner ear when operatively connected thereto by said supporting means.

4. In an audiphone, the combination of a vibratory mechanism comprising two members having unequal inertias, relatively stiff spring means connecting said members permitting a limited relative movement between at least portions of both members, electrical means adapted to respond to varying currents within the audible frequency range operatively electrically coupled to said portions of said members for relatively vibrating the same, a relatively flat contactor for engaging the user secured to the member having less inertia and having an area at least as large as the said portion of said last-named member, and supporting means directly mechanically coupled to the member having greater inertia for holding the same substantially stationary in use for vibration of the contactor and the low inertia member relatively thereto when said electrical means is energized, whereby the contactor transmits its vibrations through the bone structure to the inner ear when operatively connected thereto by said supporting means.

5. In an audiphone, the combination of a vibratory mechanism comprising two members having unequal inertias, relatively stiff spring means connecting said members permitting a limited relative movement between at least portions of both members, electrical means adapted to respond to varying currents within the audible frequency range operatively electrically coupled to said portions of said members for relatively vibrating the same, a relatively flat contactor for engaging the user secured to the member having less inertia and having an area at least as large as the said portion of said last-named member, supporting means directly mechanically coupled to the member having greater inertia for holding the same substantially stationary in use for vibration of the contactor and the low inertia member relatively thereto when said electrical means is energized, whereby the contactor transmits its vibrations through the bone structure to the inner ear when operatively connected thereto by said supporting means, and resilient means interposed between said contactor and a fixed part of the audiphone for limiting the movement of the contactor relatively to said part under excessive pressure between them.

6. In an audiphone, the combination of a vibratory mechanism comprising a relatively flat reed member and a cooperating electromagnetic member including a permanent magnet, relatively stiff spring means connecting said members permitting a limited relative movement between at least portions of both members, a voice coil operatively associated with said electromagnetic member and adapted to relatively vibrate said portions of said members when energized by varying currents within the audible frequency range, a relatively flat contactor for engaging the user secured to said reed member and having an area substantially coextensive therewith, and a supporting means directly mechanically coupled to said magnet for holding the same substantially stationary in use for vibration of the contactor and the reed member relatively thereto when said voice coil means is energized, whereby the contactor transmits its vibrations through the bone structure to the inner ear when operatively connected thereto by said supporting means.

7. In an audiphone, the combination of a resilient headband, electromagnetic means adapted to respond to varying currents throughout the audible frequency range, a casing enclosing said electromagnetic means and having a wall forming a contactor, means connecting said headband to said electromagnetic means for holding said electromagnetic means substantially stationary, and an armature fixed to said contactor for vibration by said electromagnetic means, said armature being substantially stiffer than the headband to prevent the resiliency of the headband from appreciably flexing and thereby suppressing vibration of said armature.

8. In an audiphone, the combination of a resilient headband, electromagnetic means adapted to respond to varying currents throughout the audible frequency range, a casing enclosing said electromagnetic means and having a wall movable relatively to the remainder of said casing and forming a contactor, means connecting said headband to said electromagnetic means for holding said electromagnetic means substantially stationary, and an armature fixed to said contactor for vibration by said electromagnetic means, said armature being substantially stiffer than the headband to prevent the resiliency of the headband from appreciably flexing and thereby suppressing vibration of said armature.

9. In an audiphone, the combination of a vibrating mechanism comprising two members, relatively stiff spring means connecting said members and permitting limited relative movement between at least portions of both members, electrical means adapted to respond to varying currents within the audible frequency range secured to said portion of one of said members, and operatively opposed to said portion of the other member for relatively vibrating the same, a casing for said mechanism secured to said other member, said casing having at least one opening therein adjacent to said one member, and supporting means directly mechanically coupled to said one member through said casing opening, whereby said casing and said other member are free to vibrate relatively to said supporting means and said one member to transmit the vibrations to the inner ear when said casing is operatively connected to the bone structure of the user by said supporting means.

HENRY KOCH.